US010721300B2

(12) United States Patent
Roy et al.

(10) Patent No.: US 10,721,300 B2
(45) Date of Patent: Jul. 21, 2020

(54) SYSTEM AND METHOD FOR OPTIMIZING TRANSFER OF DATA CHUNKS USING RADIO FREQUENCY (RF) HANDSHAKING

(71) Applicant: ARC Document Solutions, LLC, San Ramon, CA (US)

(72) Inventors: Rahul Roy, Fremont, CA (US); Srinivasa Rao Mukkamala, Fremont, CA (US); Himadri Majumder, Nadia (IN); Dipali Bhattacharya, Kolkata (IN)

(73) Assignee: ARC Document Solutions, LLC, San Ramon, CA (US)

(*) Notice: Subject to any disclaimer, the term of this patent is extended or adjusted under 35 U.S.C. 154(b) by 133 days.

(21) Appl. No.: 15/994,009

(22) Filed: May 31, 2018

(65) Prior Publication Data

US 2018/0352029 A1 Dec. 6, 2018

(30) Foreign Application Priority Data

Jun. 2, 2017 (IN) .............................. 201711019350

(51) Int. Cl.
*H04L 12/00* (2006.01)
*H04L 29/08* (2006.01)
*H04L 12/721* (2013.01)
*G06Q 10/10* (2012.01)

(52) U.S. Cl.
CPC ......... *H04L 67/1095* (2013.01); *G06Q 10/10* (2013.01); *H04L 45/124* (2013.01); *H04L 67/06* (2013.01); *H04L 45/66* (2013.01)

(58) Field of Classification Search
CPC ... H04L 67/1095; H04L 45/66; H04L 45/124; H04L 67/06; G06Q 10/10
USPC ......... 709/205, 213, 233; 711/103, 112, 113, 711/114, 165; 710/22
See application file for complete search history.

(56) References Cited

U.S. PATENT DOCUMENTS

| | | | | |
|---|---|---|---|---|
| 6,092,150 A * | 7/2000 | Sokolov | ................. | G06F 3/061 711/113 |
| 7,447,839 B2 * | 11/2008 | Uppala | ............... | G06F 11/1052 711/114 |
| 7,516,239 B2 * | 4/2009 | Poyourow | ......... | G06F 16/24553 709/233 |
| 8,468,135 B2 * | 6/2013 | Constantinescu | ... | G06F 11/1453 707/640 |
| 8,495,166 B2 * | 7/2013 | Perantatos | .......... | G06F 16/9574 709/213 |
| 8,621,176 B2 * | 12/2013 | Schindler | .............. | G06F 3/0613 711/112 |
| 8,819,288 B2 * | 8/2014 | Abdo | .................. | H03M 7/3084 709/231 |
| 9,015,397 B2 * | 4/2015 | Sharifie | .................. | G06F 13/28 710/22 |

(Continued)

*Primary Examiner* — Frantz Coby
(74) *Attorney, Agent, or Firm* — Kilpatrick Townsend & Stockton LLP

(57) ABSTRACT

A method and a system to optimize the transfer of data chunks between Source Devices and Destination Devices using a transfer administer is described, wherein the Source Devices, the Destination Devices and the transfer administrator are interspersed in a Collaborative Work Environment, and wherein the optimization is accomplished by performing radio frequency (RF) signal based handshakes between the Source Devices and the transfer administrator.

16 Claims, 12 Drawing Sheets

(56) References Cited

U.S. PATENT DOCUMENTS

| | | | |
|---|---|---|---|
| 9,110,964 B1* | 8/2015 | Shilane | G06F 16/178 |
| 9,971,710 B2* | 5/2018 | Agarwal | G06F 13/1615 |
| 2009/0313248 A1* | 12/2009 | Balachandran | H03M 7/3084 |
| 2010/0185803 A1* | 7/2010 | Gjoerup | G06F 13/385 |
| | | | 711/103 |
| 2014/0223131 A1* | 8/2014 | Agarwal | G06F 13/1615 |
| | | | 711/165 |
| 2015/0249727 A1* | 9/2015 | Luna | H04L 67/2828 |
| | | | 709/247 |
| 2017/0322996 A1* | 11/2017 | Horowitz | G06F 16/278 |

* cited by examiner

| SRC \ DSTN | C1<br>00-A0-CC-23-AF-4F | C2<br>00-1A-CC-23-1B-90 | C3<br>00-50-56-C0-69-3D | C4<br>00-37-48-E6-12-B5 | C5<br>00-30-65-73-FL-66 |
|---|---|---|---|---|---|
| C1<br>00-A0-CC-23-AF-4F | Amp = 100Å<br>λ= 100Å | Amp = 200Å<br>λ= 100Å | Amp = 300Å<br>λ= 100Å | Amp = 400Å<br>λ= 100Å | Amp = 500Å<br>λ= 100Å |
| C2<br>00-1A-CC-23-1B-90 | Amp = 100Å<br>λ= 200Å | Amp = 200Å<br>λ= 200Å | Amp = 300Å<br>λ= 200Å | Amp = 400Å<br>λ= 200Å | Amp = 500Å<br>λ= 200Å |
| C3<br>00-50-56-C0-69-3D | Amp = 100Å<br>λ= 300Å | Amp = 200Å<br>λ= 300Å | Amp = 300Å<br>λ= 300Å | Amp = 400Å<br>λ= 300Å | Amp = 500Å<br>λ= 300Å |
| C4<br>00-37-48-E6-12-B5 | Amp = 100Å<br>λ= 400Å | Amp = 200Å<br>λ= 400Å | Amp = 300Å<br>λ= 400Å | Amp = 400Å<br>λ= 400Å | Amp = 500Å<br>λ= 400Å |
| C5<br>00-30-65-73-FL-66 | Amp = 100Å<br>λ= 500Å | Amp = 200Å<br>λ= 500Å | Amp = 300Å<br>λ= 500Å | Amp = 400Å<br>λ= 500Å | Amp = 500Å<br>λ= 500Å |

SYSTEM AND METHOD FOR OPTIMIZING TRANSFER OF DATA CHUNKS USING RADIO FREQUENCY (RF) HANDSHAKING

CROSS-REFERENCES TO RELATED APPLICATIONS

This application claims the benefit of Indian Application No. 201711019350, filed Jun. 2, 2017, which is hereby incorporated by reference in its entirety for all purposes.

BACKGROUND

1. Field of the Invention

The present application relates generally to the field of optimizing the transfer of data chunks, and more particularly, to the field of optimizing the transfer of data chunks pertaining to electronic data files between client devices interspersed in a Collaborative Work Environment, using radio frequency (RF) signals.

2. Description of the Related Art

The proliferation of networks such as intranets, extranets, and the internet has made way for newer corporate environments based on Information & Communication Technology that facilitate delocalized development, completion and execution of projects. One such preferred environment is a Collaborative Work Environment which allows persons and/or entities to participate, contribute and develop projects synchronously, irrespective of their geographical locations. Person skilled in the art would appreciate that since the Collaborative Work Environment is premised on the principle of synchronizing the efforts of members working on the projects, it is highly likely that the projects implemented in the Collaborative Work Environment may possess developmental contingencies, that is, information and/or data generated by, or available with a particular professional working on a particular project, may serve as inputs, or may have utility in accomplishing tasks assigned to one other professionals also working on that particular project.

Thus prompt and efficient sharing of files bearing data/information relevant to the projects (henceforth called "electronic data files") between client devices through which the project members operate, is indispensable to the Collaborative Work Environment because without it there may be no meeting of the developmental contingencies in a timely fashion, which in turn would lead to failure to synchronize the efforts of the professionals, and subsequent failure to execute the projects.

Various solutions have been devised and developed to facilitate prompt and efficient transfer of electronic data files between the client devices in the Collaborative Work Environment. One such preferred solution is based on the technique of data chunking which, in the broadest sense, breaks down the electronic data files destined for transfer into data chunks, that is, smaller fragments obtained from the electronic data files themselves, transmits the data chunks across the Collaborative Work Environment to the client devices destined to receive them, and, reconstitutes the data chunks received at the client devices destined to receive them, to obtain back the electronic data files.

The transferring of the data chunks across the Collaborative Work Environment and the subsequent reconstitution to obtain back the electronic data files, instead of transferring the entire electronic data files between the client devices, does away with delays and/or lags in transfer, degradation of quality of content, distortion of content, and such other problems. Further, the transferring of data chunks instead of the entire electronic data files also does away with the problem of complete failure to transfer which arises in special circumstances where the client devices destined to receive the electronic data files have file systems that disallow the receiving of electronic data files beyond a size threshold. For example, the size threshold of the client devices with (file allocation table) FAT 32 file systems is 4 GB (gigabytes). Therefore, there would be a complete failure to transfer the electronic data files greater than 4 GB to such client devices.

While transferring the data chunks is the most suitable way for transferring the electronic data files across the Collaborative Work Environment, said transferring of the data chunks may bring with it a different problem of traffic mismanagement. Person skilled in the art would appreciate that the division of the electronic data files into the data chunks drastically increases the number of items to be transferred across the Collaborative Work Environment, which if not managed properly, may lead to traffic congestions, misdirection of the data chunks to client devices not destined to receive them, and/or loss of the data chunks.

There is a need in the art to address the aforesaid problem and offer a solution that optimizes the movement of the data chunks between the client devices in the Collaborative Work Environment, and particularly minimizes the traffic congestion in the Collaborative Work Environment and prevents the data chunks from getting lost or reaching Client devices not destined to receive them.

BRIEF SUMMARY

Generally, embodiments of the present invention are intended to address at least the above mentioned problems and/or disadvantages and to provide a suitable solution. Accordingly, an aspect is to provide a system and a method for regulating transfer of data chunks between client devices interspersed in a Collaborative Work Environment.

In accordance with an aspect, a system is provided to optimize the transfer of data chunks between client devices interspersed in the Collaborative Work Environment using a transfer administrator, wherein the optimization is accomplished by performing radio frequency (RF) signal-based handshakes.

In accordance with one other aspect of the present invention a method is provided for optimizing the transferring of data chunks between client devices interspersed in the Collaborative Work Environment, in conjunction with the system stated above, wherein the optimizing is accomplished by performing radio frequency (RF) signal based handshaking.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments will be more apparent from the detailed description that follows taken in conjunction with the accompanying drawings, wherein:

FIG. 4 illustrates an exemplary RF reference file,

DETAILED DESCRIPTION

Figure 1:
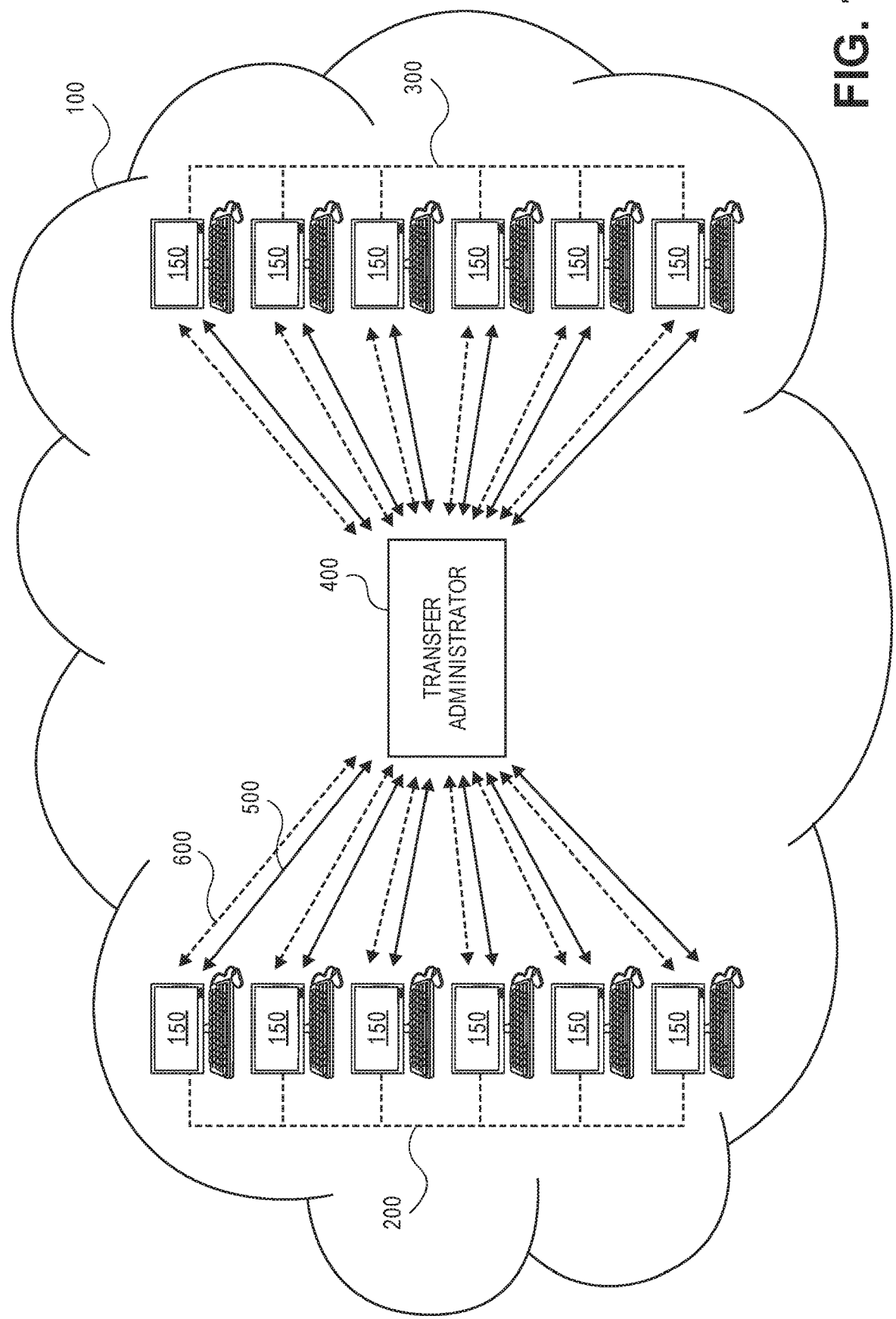
FIG. 1 illustrates a Collaborative Work Environment.

Advantages and features of the present invention and methods of accomplishing the same may be understood more readily by referring to this detailed description of preferred embodiments and the accompanying drawings. The present invention may, however, be embodied in many different forms and should not be construed as being limited to the embodiments set forth herein. Rather, these embodiments should be considered for thorough and complete disclosure of the invention and for fully conveying the concept of the invention to those skilled in the art. For the sake of simplicity various aspects of the preferred system and method embodiments are referred using numerals which refer to the same aspects throughout the specification.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising", when used in this specification, specify the presence of stated features, integers, steps, operations, elements, and/or components, but do not preclude the presence or addition of other features, integers, steps, operations, elements, and/or components.

Various techniques and mechanisms of the present invention will sometimes be described in singular form for clarity. Such singular descriptions of techniques and mechanisms may however include multiple iterations of that technique and/or multiple instantiations of that mechanism, respectively, unless the context suggests otherwise. Furthermore, various techniques and mechanisms of the present invention will sometimes describe a connection between two entities. It should be noted that the connection between two entities does not necessarily mean a direct, unimpeded connection, as a variety of other entities may reside between the two entities. These entities may include without limitation, network peripherals including routers, bridges, modems, hubs, amplifiers, switches, repeaters or a combination thereof. Further the connection between any two entities disclosed in the invention should not only be construed as being dedicated hard wired connections, but should also include virtual and/or wireless connections.

It will be understood that, although the terms first, second, third etc., may be used herein to describe some elements, components, regions, layers and/or sections, these elements, components, regions, layers and/or sections should not be limited by these terms. Thus, a first element, component, region, layer and/or section disclosed in the description could be termed as a second element, component, region, layer and/or section, or vice versa, without departing from the teachings of the present invention.

Unless otherwise defined, the terms (including technical and scientific terms) used herein shall have the same meaning as commonly understood by one of ordinary skill in the art. Further, the terms defined in commonly used dictionaries should be interpreted and construed in a manner consistent with their dictionary meaning, and should not be interpreted in an idealized or overly formal sense unless expressly defined.

FIG. 1 to FIG. 10, discussed below are non-limiting illustrations which have been used to explain and describe embodiments of the invention disclosed herein. A person skilled in the art will appreciate that the purpose of these figures is to provide clarity to the concepts associated with the various technical embodiments of the invention and not to limit the invention. These figures include without limitation, block diagrams, flowcharts, schematics and/or other simplistic representations that explain the various aspects of the invention with ease and effectiveness.

Referring now to drawings, and first to FIG. 1, a Collaborative Work Environment is designated by the numeral 100 which comprises Source Devices 200, that is, client devices 150 carrying the data chunks destined for transfer, Destination Devices 300, that is, client devices 150 intended to receive the data chunks transferred from the Source Devices 200, and a transfer administrator 400 for facilitating the transfer of the data chunks between the Source Devices 200 and the Destination Devices 300. In accordance with the invention this Collaborative Work Environment 100 may be implemented on wired networks, wireless networks or a combination thereof, wherein the networks may include without limitation Local Area Networks, Metropolitan Area Networks, Wide Area Networks, and the internet, if required. A person skilled in the art would appreciate that the choice of the networks for implementing a particular Collaborative Work Environment 100 would depend on the territorial cover/span that the particular Collaborative Work Environment 100 has to achieve in order to connect the Source Devices 200, the Destination Devices 300, and the transfer administrator 400. Further the Collaborative Work Environment 100 also comprises RF communication channels 500 for facilitating the transfer of RF signals through the Collaborative Work Environment 100, and data communication channels 600 for facilitating the transfer of non RF data/information (e.g. data chunks) through the Collaborative Work Environment 100, wherein the RF communication channels 500 and the data communication channels 600 may be wired, wireless or in combination, and may implement enroute, network peripherals including routers, bridges, modems, hubs, amplifiers, switches, repeaters or a combination thereof for efficient transfer.

In accordance with the invention the Source Devices 200 and the Destination Devices 300 are client devices 150 which comprise a client side data historian 160 (see FIG. 2) selected from amongst digital databases, cloud databases, on premise databases, relational databases including Oracle RDBMS, Microsoft SQL Server, IBM DB2, MySQL and PostgreSQL, NOSQL databases, (enterprise resource planning) ERPs, (customer relationship management) CRM systems, and/or a combination thereof, that store the data/information at discrete tuples which may access, operate, federate, combine, sync, and link with the other discrete tuples therein; client side processors 165 with specialized client side processing units including integrated system (bus) controllers, memory management control units, floating point units, graphics processing units, digital signal processing units, or a combination thereof, that invoke a metadata resolution module 170, an RF signal generation module 175, and a first receipt—dispatch module 180. The client side processors 165 may be designed and developed from scratch or obtained by substantially reconstructing preexisting processors including embedded processors such as Application-Specific Integrated Circuits (ASICs), Digital Signal Processors (DSPs), Field Programmable Gate Arrays (FPGAs), or microprocessors such as AMD Athlon, AMD Duron, AMD Opteron, ARM's range of micro processors, IBM PowerPC, Intel Core, Intel Itanium, Intel Xeon, Intel Celeron or a combination thereof.

Figure 2:
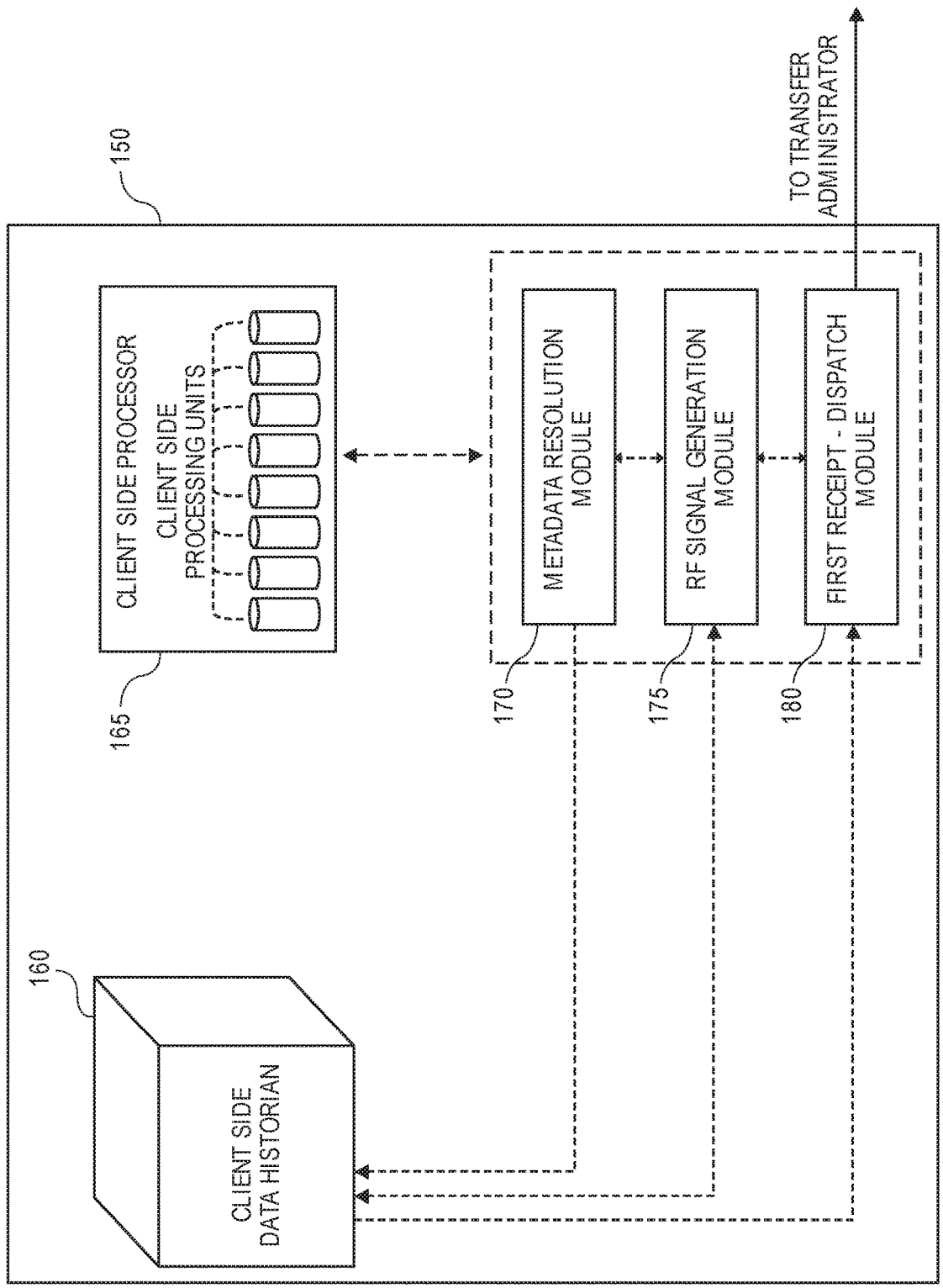
FIG. 2 illustrates a block diagram of the client device.

FIG. 2 illustrates a block diagram of the client device 150 described above. As emphasized in forgoing paragraphs, the client devices 150 may be configured as the Source Devices 200 or the Destination Devices 300 for each round of transfer, such that based on the configuration, the activities performed by client slide data historian 160, the client side processors 165, the metadata resolution module 170, the RF signal generation module 175, and the first receipt—dispatch module 180, at the client devices 150 may vary.

An aspect is initiated at the Source Devices 200 where the data chunks pertaining to the electronic data files destined for transfer are stored at a first set of discrete tuples in the client side data historian 160. After storing the data chunks, the client side processors 165 invoke the metadata resolution module 170 that determines the "SRC" metadata value, that is, the MAC/Network Address of the Source Device 200 where the data chunks destined for transfer are stored, and further determines the "DSTN" metadata value, that is, the MAC/Network Address of the Destination Device 300 where the data chunks stored at the Source Device 200 bearing the "SRC" metadata value determined thereof, are destined to be received.

The "SRC" metadata value and the "DSTN" metadata value determined thereof, are thereafter, either directly forwarded to the RF signal generation module 175 for further processing and/or use, or stored at a second set of discrete tuples in the client side data historian 160 and then forwarded therefrom to the RF signal generation module 175. Person skilled in the art would appreciate that while the storing of the "SRC" metadata value and the "DSTN" metadata value at the second set of discrete tuples in the client side data historian 160 is not essential to the working of the invention, it may still be preferred in some embodiments in case the "SRC" metadata values and/or the "DSTN" metadata values are lost or altered during the course of the working of the embodiment. Particularly while being forwarded to the RF signal generation module 175, a backup copy of the "SRC" metadata value and the "DSTN" metadata value may be obtained from the second set of discrete tuples in the client side data historian 160 to reinitiate from that point onwards instead of starting from scratch.

The "SRC" metadata value and the "DSTN" metadata value determined and forwarded from the metadata resolution module 170 or the second set of discrete tuples in the client side data historian 160, as the case may be, are received at the RF signal generation module 175. The RF signal generation module 175, in the broadest sense, utilizes the "SRC" metadata value and the "DSTN" metadata value to generate RF signals of specific amplitudes and specific wavelengths destined for transmittal to the transfer administrator 400 (see FIG. 1) wherein the RF signals convey thereat that there are data chunks of a particular electronic data file at the Source Device 200 sending the RF signal which are ready to be transferred to a particular Destination Device 300.

Figure 3:
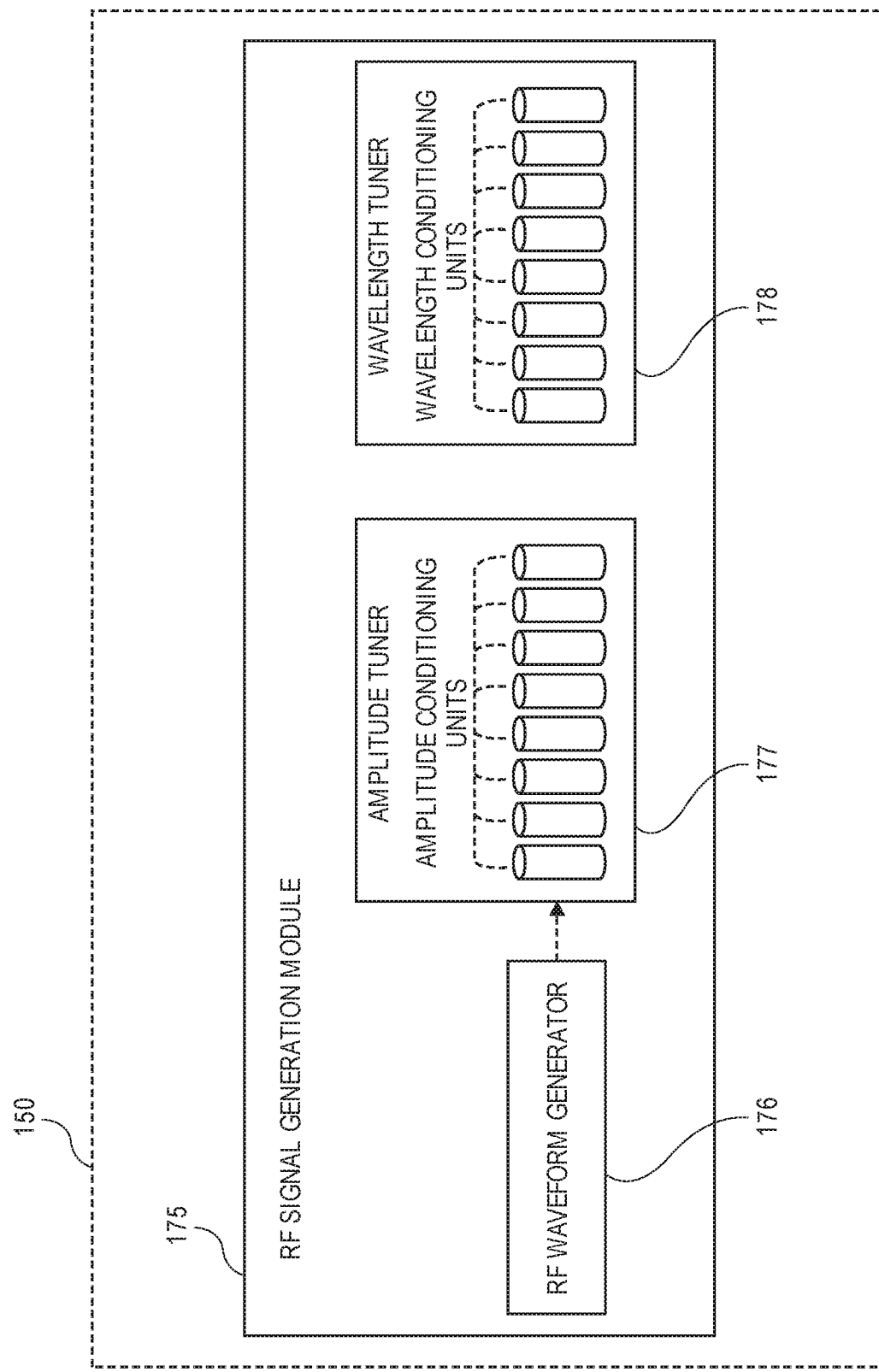
FIG. 3 illustrates a block diagram of the RF signal generation module.

FIG. 3 illustrates a block diagram of the RF signal generation module 175 which comprises an RF waveform generator 176, an amplitude tuner 177, and a wavelength tuner 178. In accordance with some embodiments, the amplitude tuner 177 and the wavelength tuner 178 are communicatively connectible with an RF reference file 700 (see FIG. 4). A person skilled in the art would appreciate that the RF reference file has been referenced by the numeral 700 since it is a virtual reference document present in the client devices 150, as well as the transfer administrator 400. At the client devices 150 configured as the Source Devices 200, the RF reference file 700 is referred for determining the amplitude and the wavelength to be kept for the RF signals generated therein, and at the transfer administrator 400, the RF reference file 700 is referred to determine the "SRC" metadata value and "DSTN" metadata value based on the amplitude and the wavelength of the RE signals received therein.

FIG. 4 illustrates the RF reference file 700. As may be seen in the illustration, the RF reference file 700 is a tabulation of amplitudes and wavelengths, and more particularly a tabulation providing an unique amplitude for each client device 150 in the Collaborative Work Environment 100 which is configured to act as the Source Device 200, and an unique wavelength for each client device 150 in the Collaborative Work Environment 100 which is configured to act as the Destination Device 300. The RF reference file 700 illustrated in the figure is for the Collaborative Work Environment 100 having five client devices 150, namely C1, C2, C3, C4 & C5. Accordingly, this RF reference file 700 sets out the amplitude and wavelength to be maintained for each of C1, C2, C3, C4 & C5 acting as the Source Devices 200 or the Destination Devices 300 for each round of transfer. Thus in a particular instance of transfer if the data chunks are to be transferred from C1 to C5 then the amplitude (Amp) of the RF signal would be 100 Å, and the wavelength ($\lambda$) of the of the RF signal would be 500 Å. Likewise, if data chunks are to be transferred from C5 to C1, then the amplitude (Amp) of the RF signal would be 500 Å, and the wavelength ($\lambda$) of the of the RF signal would be 100 Å. A person skilled in the art would appreciate that the illustration has been given a textual outlook to explain the contents therein. In actuality the RF reference file 700 is a log file, or a combination of log files that contain the requisite information which is readable and interpretable by the client devices 150 and the transfer administrator 400 within the Collaborative Work Environment 100.

In accordance with the invention, when the RF signal generation module 175 (see FIG. 3) is invoked then firstly the RF waveform generator 176 generates a standard waveform of a specific amplitude (Amp) and a specific wavelength ($\lambda$). In a preferred characterization, the choice of the standard waveform to be generated, and the choice of the amplitude and the wavelength to be set for the standard waveform may be obtained from registered users of the Collaborative Work Environment 100, wherein the choice of the standard waveform to be generated maybe made from amongst sine waveforms, square waveforms, sawtooth waveforms, and triangle waveforms.

The RF waveform generated at the RF waveform generator 176 is then subjected to the amplitude tuner 177, comprising amplitude conditioning units, that performs a two—fold operation. Firstly, it obtains the "SRC" metadata value either from the metadata resolution module 170 directly, or from the second set of discrete tuples in the client side data historian 160, as the case may be, and thereafter sets the amplitude of the RF waveform as per the amplitude fixed for the Source Device 200 bearing the "SRC" metadata value obtained thereof, by referring to the RF reference file 700.

The RF waveform with set amplitude is then subjected to the wavelength tuner 178 containing wavelength conditioning units that also performs a two—fold operation. Firstly, it obtains the "DSTN" metadata value either from the metadata resolution module 170 directly, or from the second set of discrete tuples in the client side data historian 160, as the case may be, and thereafter sets the wavelength of the RF waveform with set amplitude, as per the wavelength fixed for the Destination Device 300 bearing the "DSTN" metadata value obtained thereof, by referring to the RF reference file 700.

Thus, the final outcome after the execution of the RF waveform generator 176, the amplitude tuner 177 and the wavelength tuner 178, at the Source Device 200, is the RF signal whose amplitude equals the amplitude set for the particular Source Device 200 which contains the data chunks to be transferred, and whose wavelength equals the wavelength set for the particular Destination Device 300 where the data chunks from the particular Source Device 200 are destined to be received, wherein the amplitude which is set for the particular Source Device 200, and the wavelength which is set for the particular Destination Device 300 are obtained by referring to the RF reference file 700.

Figure 5:
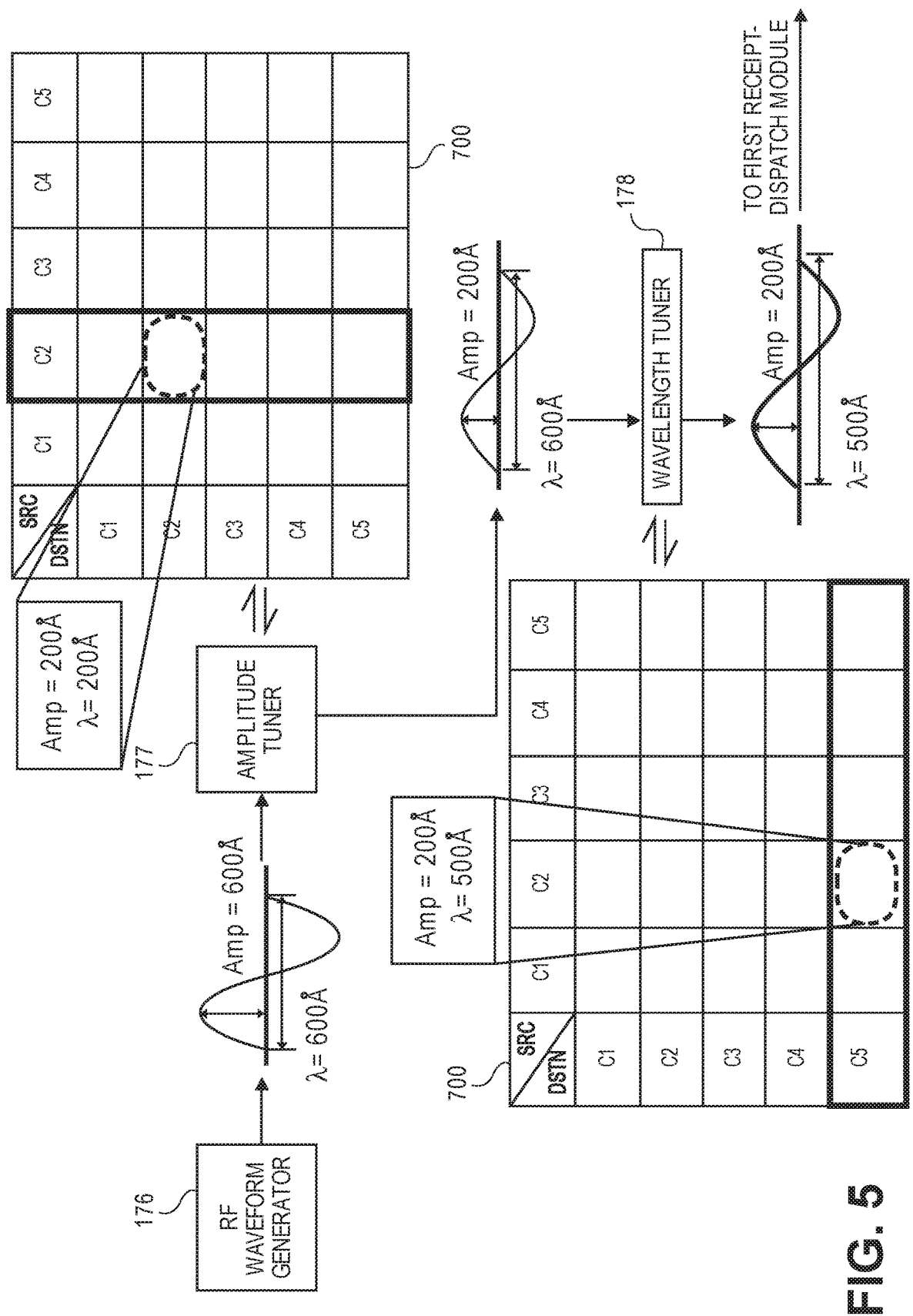
FIG. 5 illustrates the activities performed at the RF signal generation module and the components therein.

FIG. 5 illustrates the activities performed at the RF signal generation module 175, and more particularly the components 176, 177, and 178 therein. The illustration shows how a particular RF signal is generated at the RF signal generation module 175 (FIG. 3) of the Source Device 200 which has data chunks to be transferred to the Destination Device 300, wherein the "SRC" metadata value and "DSTN" metadata value of C2 and C5, respectively, are stored at the second set of discrete tuples in the client side data historian 160.

In accordance with the figure, firstly the RF waveform is generated at the RF waveform generator 176 having Amplitude (Amp), say 600 Å, and Wavelength (λ) say 600 Å. This RF waveform is then subjected to the amplitude tuner 177 that learns the "SRC" metadata value for C2 from the second set of discrete tuples in the client side data historian 160, and thereafter refers to the RF reference file 700 to determine the amplitude to be set, which in case of C2 is 200 Å. Post determination of amplitude, the amplitude tuner 177 sets the amplitude of the RF waveform accordingly.

The RF waveform with set amplitude is then subjected to the wavelength tuner 178 that learns the "DSTN" metadata value for C5 from the second set of discrete tuples in the client side data historian 160, and thereafter refers to the RF reference file 700 to determine the wavelength to be set, which in case of C5 is 500 Å. Post determination of wavelength, the wavelength tuner 178 sets the wavelength for the RF waveform with set amplitude, accordingly.

A person skilled in the art would appreciate that for the purpose of this invention the setting of the amplitude of the RF waveform by the amplitude tuner 177 and the setting of the wavelength of the RF waveform with set amplitude by the wavelength tuner 178 implies performing mathematical functions and/or operations that enhance or reduce the amplitude and/or wavelength of the RF waveform on a per requirement basis.

Once the RF signal is generated at the RF signal generation module 175 of the Source Device 200, it is forwarded to the first receipt—dispatch module 180, or alternatively, stored at a third set of discrete tuples in the client side data historian 160 and then forwarded therefrom to the first receipt—dispatch module 180. Person skilled in the art would appreciate that while the storing of the RF Signal at the third set of discrete tuples in the client side data historian 160 is not essential to the working of the invention, it is still preferred, because in case the RF signal is lost or altered during the course of the working of the invention, particularly while being forwarded to the first receipt—dispatch module 180, a backup copy of the RF signal may be obtained from the third set of discrete tuples in the client side data historian 160 to reinitiate the working of the invention from that point onwards instead of starting from scratch.

The RF Signal forwarded from the RF signal generation module 175 or the third set of discrete tuples in the client side data historian 160, as the case may be, are received at the first receipt—dispatch module 180 (see FIG. 2) that transfers the RF signal to the transfer administrator 400 through the RF communication channels 500 which implement, enroute, network peripherals such as routers, bridges, modems, hubs, switches, or a combination thereof, enroute, to ensure proper and efficient transfer of the RF signal through the RF communication channels 500 (see FIG. 1), and network peripherals such as amplifiers, repeaters or a combination thereof, enroute, to prevent attenuation and strength loss of the RF signal and maintain it at its original state during its course of transfer.

Figure 6:
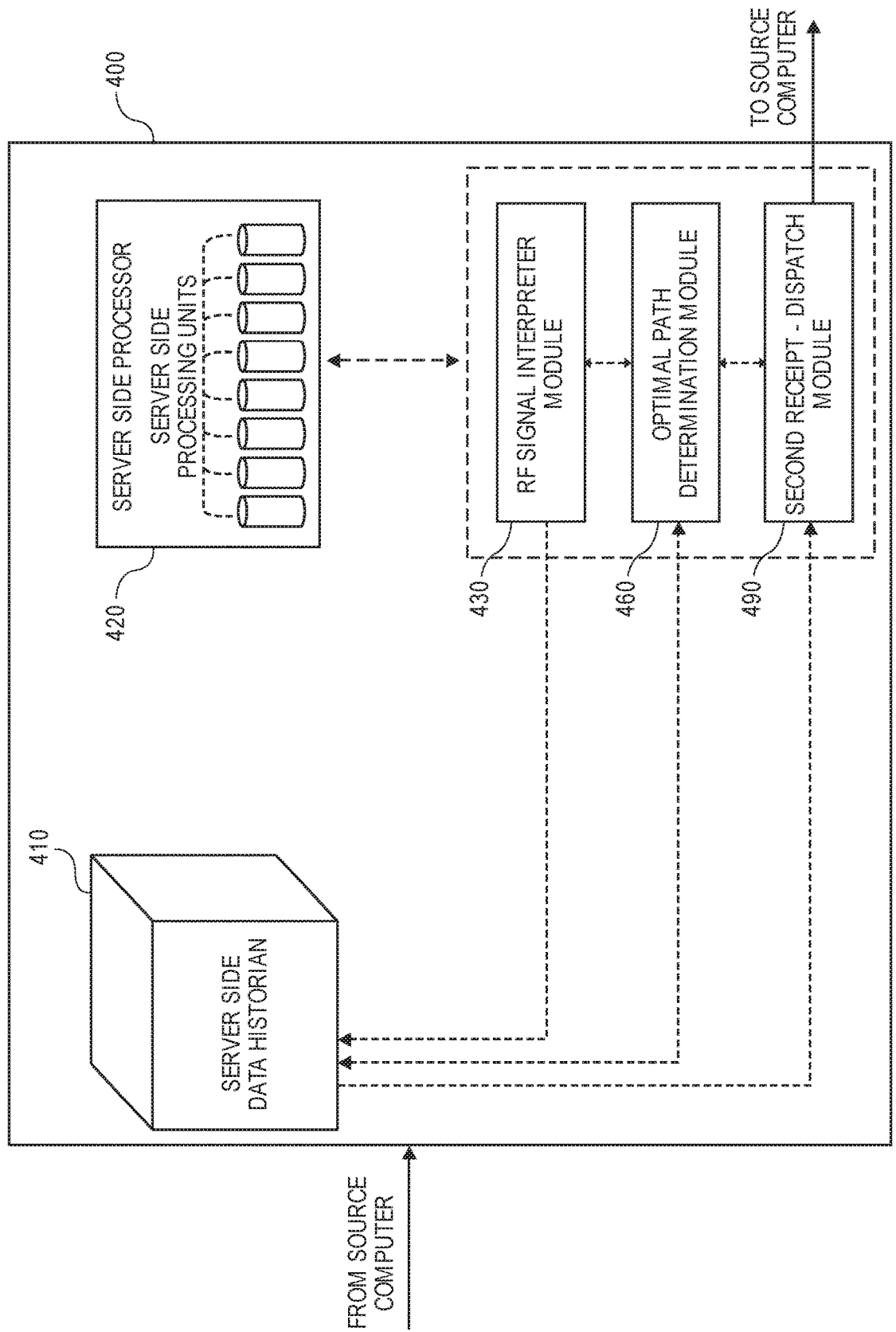
FIG. 6 illustrates a block diagram of the transfer administrator.

FIG. 6 illustrates a block diagram of the transfer administrator 400. As per the illustration the transfer administrator 400 at least comprises a server side data historian 410 and server side processors 420 containing server side processing units, wherein the server side processors 420 and the server side processing units therein, invoke a RF signal interpretation/interpreter module 430, an optimal path determination module 460 and a second receipt—dispatch module 490. Based on the illustration, a person skilled in the art would appreciate that the server side data historian 410 and the server side processors 420 housing the server side processing units, are constituted and organized just like the client side data historian 160 and the client side processors 165, however the server side components 410, 420 have very different functions and purpose as compared to the client side components 160, 165.

Figure 7:
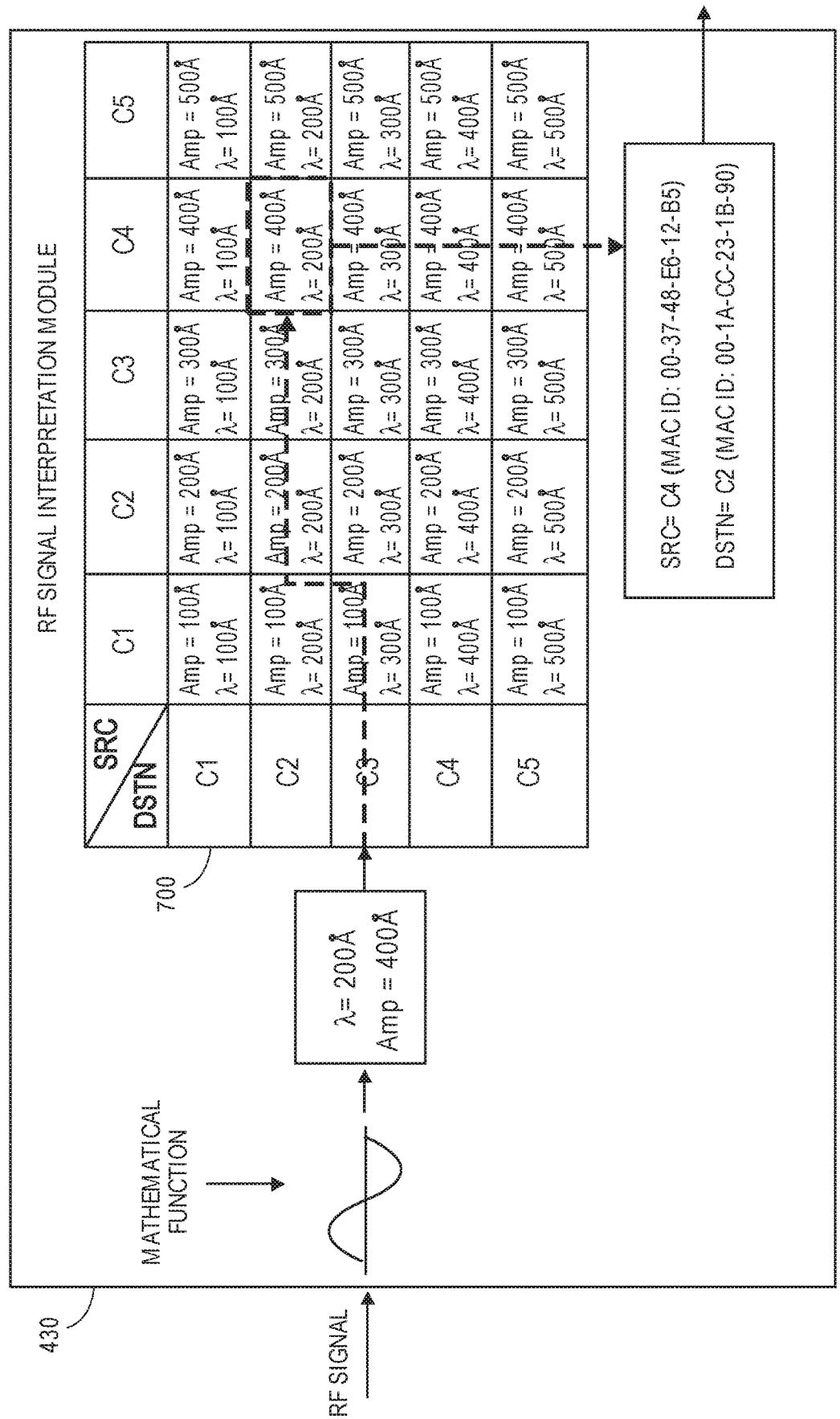
FIG. 7 illustrates the working of the RF signal interpretation module.

When the RF signal transmitted from a particular Source Device 200 is received at the transfer administrator 400, then firstly the server side processors 420 trigger a locking operation which bars the entry of any further RF signals at the transfer administrator 400 until the activities for the RF signal received therein are completed at/in relation to the transfer administrator 400. After locking the transfer administrator 400, the server side processors 420 invoke the RF signal interpretation module 430 which performs a two-fold operation. Firstly, the RF signal interpretation module 430 calculates the amplitude and the wavelength of the RF signal by applying mathematical functions and/or operations. After calculating the amplitude and the wavelength of the RF signal, the RF signal interpretation module 430 refers to the RF reference file 700 for determining, with the help of amplitude calculated thereof, the "SRC" metadata value, that is, the MAC address/Network address of the Source Device 200 wherein the data chunks destined for transfer are stored, and for determining, with the help of the wavelength calculated thereof, the "DSTN" metadata value, that is, the MAC address/Network address of the Destination Device 300 which is destined to receive the data chunks stored at the Source Device 200 determined thereof. Person skilled in the art may appreciate that in accordance with the invention, the RF reference file 700 may be located anywhere within the transfer administrator 400 including within one of the modules 430, 460, FIG. 7 illustrates the working of the RF signal interpretation module 430. As seen in the illustration, the RF signal received therein is, firstly, subjected to mathematical functions and/or operations that calculate the amplitude and the wavelength of the RE signal. As per the illustration, the amplitude (Amp) calculated for the RF signal is 400 Å, and the wavelength (λ) calculated for the RF signal is 200 Å. The RF signal interpretation module 430 thereafter refers to the RF reference file 700 to determine the MAC/Network Address of that Source Device 200 that has amplitude (Amp) of 400 Å and to determine the MAC/Network Address of that Destination Device 300 that has wavelength (λ) of 200 Å. As per the illustration, after referring to the RE reference file 700 the MAC/Network Address of the Source Device 200 is determined as 00-37-48-E6-12-B5, and the MAC/Network Address of the Destination Device 300 is determined as 00-1A-CC-23-1B-90.

The MAC/Network Address of the Source Device 200, that is, the value of the "SRC" metadata, and the MAC/Network Address of the Destination Device 300, that is, the value of the "DSTN" metadata, determined at the RF Signal interpretation module 430 are then either directly forwarded to the optimal path determination module 460, or alternatively, stored at a first set of discrete tuples in the server side data historian 410 and then forwarded therefrom to the optimal path determination module 460. A person skilled in the art would appreciate that while the storing the "SRC" metadata value and the "DSTN" metadata value at the first set of discrete tuples in the server side data historian 410 is not essential to the working of the embodiment, it is still preferred, because in case the RF signal is lost or altered during the course of working of the invention, particularly while being forwarded to the optimal path determination module 460, a backup copy of the "SRC" metadata value and the "DSTN" metadata value may be obtained from the first set of discrete tuples in the server side data historian 410 to reinitiate the working of the invention from that point onwards instead of starting from scratch.

The "SRC" metadata value and the "DSTN" metadata value determined thereof, are forwarded to the optimal path determination module 460 either directly from the RF Signal interpretation module 430 or from the first set of discrete tuples in the server side data historian 410, as the case may be, wherein the optimal path determination module 460, in the broadest sense determines an optimal path between the Source Device 200 and the Destination Device 300 bearing the "SRC" metadata value forwarded thereto, and the "DSTN" metadata value forwarded thereto, respectively.

In accordance with the embodiment, the optimal path determination module 460, performs a three-fold operation. Firstly, it determines a shortest path tree set (sptset) within the Collaborative Work Environment 100 wherein the shortest path tree set (sptset) comprises the client devices 150 in the Collaborative Work Environment 100 and the direct paths between them, wherever applicable.

Person skilled in the art would appreciate that it may not always be possible for the client devices 150 in the Collaborative Work Environment 100 to have dedicated one to one paths between them due to technical, geographical and often economical constraints, and therefore many times, the transfer between a particular Source Device 200 and a particular Destination Device 300 is carried out using intermediary client device(s) 150. In such cases, whenever data chunks are to be transferred then the Source Device 200 destined to transfer the data chunks sends the data chunks to the intermediary client device(s) 150 which then route the same to the Destination Device 300 destined to receive the data chunks routed thereof. Accordingly, for the purpose of this invention, whenever a particular Source Device 200 and a particular Destination Device 300 transfer data chunks between themselves, directly, that is, without using intermediary client device(s) 150 then they will be deemed to have a "direct path" between them, and whenever a particular Source Device 200 and a particular Destination Device 300 transfer data chunks between themselves, indirectly, that is, by using intermediary client device(s) 150 then they will be deemed to have an "indirect path" between them.

In light of the forgoing explanation, when optimal path determination module 460, determines a shortest path tree set (sptset) within the Collaborative Work Environment 100 then the shortest path tree set (sptset) comprises the client devices 150 in the Collaborative Work Environment 100 and those paths between the client devices 150 that are one to one and unimpeded, and which do not require intermediate client device(s) 150 for transferring.

Figure 8:
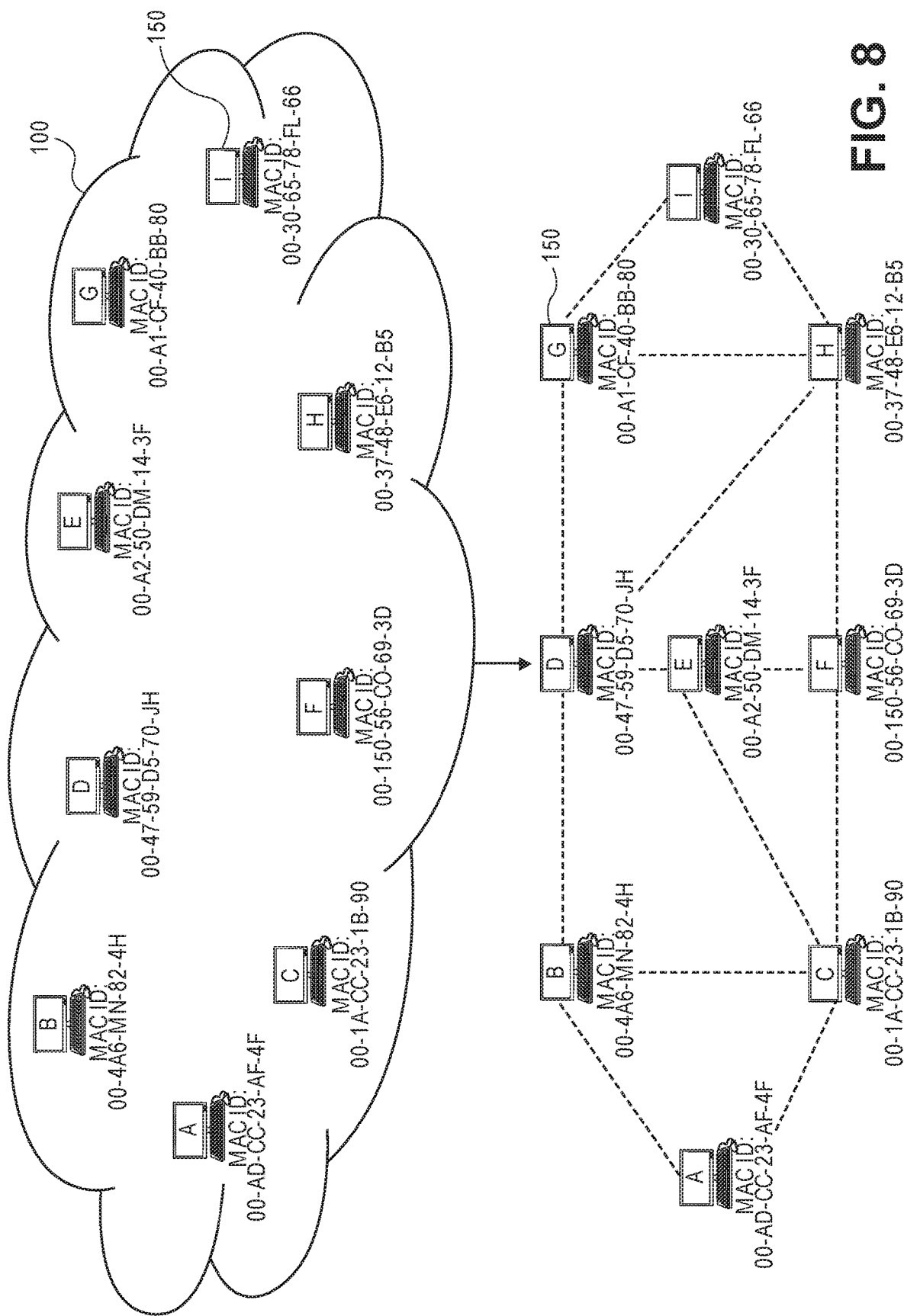
FIG. 8 illustrates the determination of the shortest path tree set (sptset) in the Collaborative Work Environment.

FIG. 8 illustrates the determination of the shortest path tree set (sptset) for a particular Collaborative Work Environment 100. As may be seen in the illustration, the Collaborative Work Environment 100 with client devices 150 "A" to "I" is demonstrated at the upper portion of the illustration, for which, the shortest path tree set (sptset) demonstrated at the lower portion wherein, the shortest path tree set (sptset) highlights all the client devices 150 and the direct paths between them, wherever applicable (e.g. path between A&B, A&C, C&E etc.).

After the shortest path tree set (sptset) is determined, the optimal path determination module 460 performs the next operation of calculating the time/cost complexity between the client devices 150 in the shortest path tree set (sptset) having direct paths between them. In a preferred embodiment, the optimal path determination module 460 may calculate the time/cost complexity between each pair of client devices 150 connected by the direct path, by transmitting a single bit of sample data between the pair of client devices 150, and assessing the time and/or resources consumed to complete the transmission of the single bit of sample data through the direct path between them.

Figure 9:
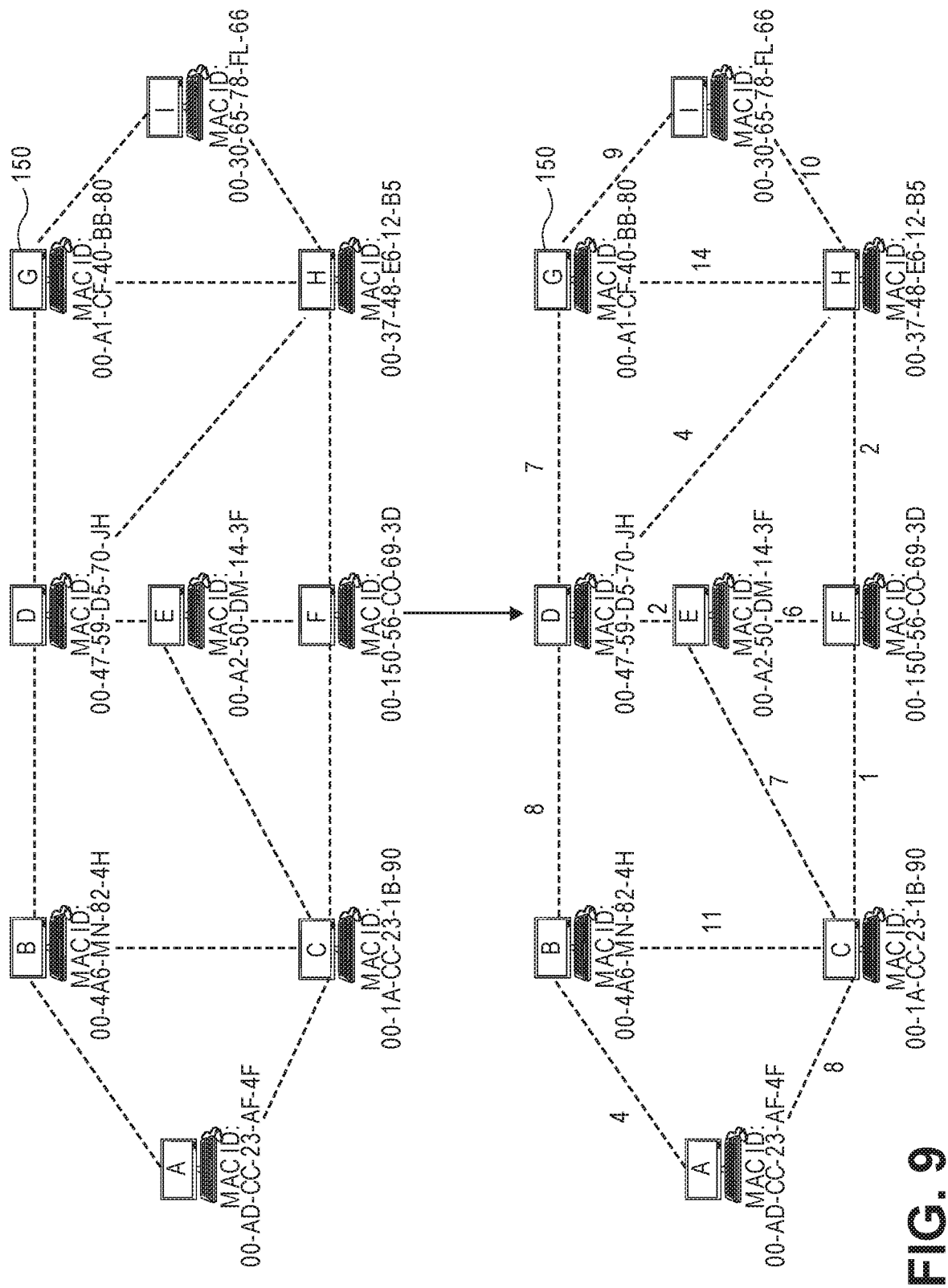
FIG. 9 illustrates the calculation of time/cost complexity between each pair of client devices in the shortest path tree set (sptset) having a direct path between them.

FIG. 9 illustrates the calculation of time/cost complexity between each pair of client devices 150 in the shortest path tree set (sptset) having the direct path between them. Accordingly in the illustration the shortest path tree set (sptset) for client devices 150 "A" to "I" highlighting the direct paths (e.g. path between A&B, A&C, C&E etc.) is shown on the upper portion of the illustration, and the corresponding time/cost complexity for the pairs of client devices 150 having the direct paths between them is shown on the lower portion of the illustration (e.g. time/cost complexity between A&B is 4 units, time/cost complexity between A&C is 8 units, etc.).

Lastly, the optimal path determination module 460, obtains the "SRC" metadata value and the "DSTN" metadata value from the RF Signal interpretation module 430, or from the first set of discrete tuples in the server side data historian 410, as the case may be, and identifies an optimal path between the Source Device 200 and the Destination Device 300 bearing the "SRC" metadata value obtained thereof and the "DSTN" metadata value obtained thereof, respectively. In accordance with the invention, the optimal path is that direct path or the combination of direct paths between the Source Device 200 bearing the "SRC" metadata value obtained thereof and the Destination Device 300 bearing the "DSTN" metadata value obtained thereof, that has the lowest time/cost complexity, and has none or nominal traffic congestion. A person skilled in the art would appreciate that the optimal path may be direct path as well as indirect path, and further appreciate that there is no specific priority of choosing direct paths and/or indirect paths as optimal paths. That is to say that if the indirect path between two Client devices 150 has lower time/cost complexity than the direct path between them, then the optimal path would be based on the indirect path. A person skilled in the art would also appreciate that if the indirect path between two client devices 150 is identified as the optimal path, then the optimal path will retain the MAC/Network Address of the intermediary client device(s) 150 as well.

In accordance with the embodiment, the optimal path determination module 460, after obtaining the "SRC" metadata value and the "DSTN" metadata value, identifies the optimal path between the Source Device 200 and the Destination Device 300 by contextual application of Dijkstra's shortest path evaluation model and/or Prim's shortest path evaluation model and/or any other suitable path evaluation models.

Figure 10:
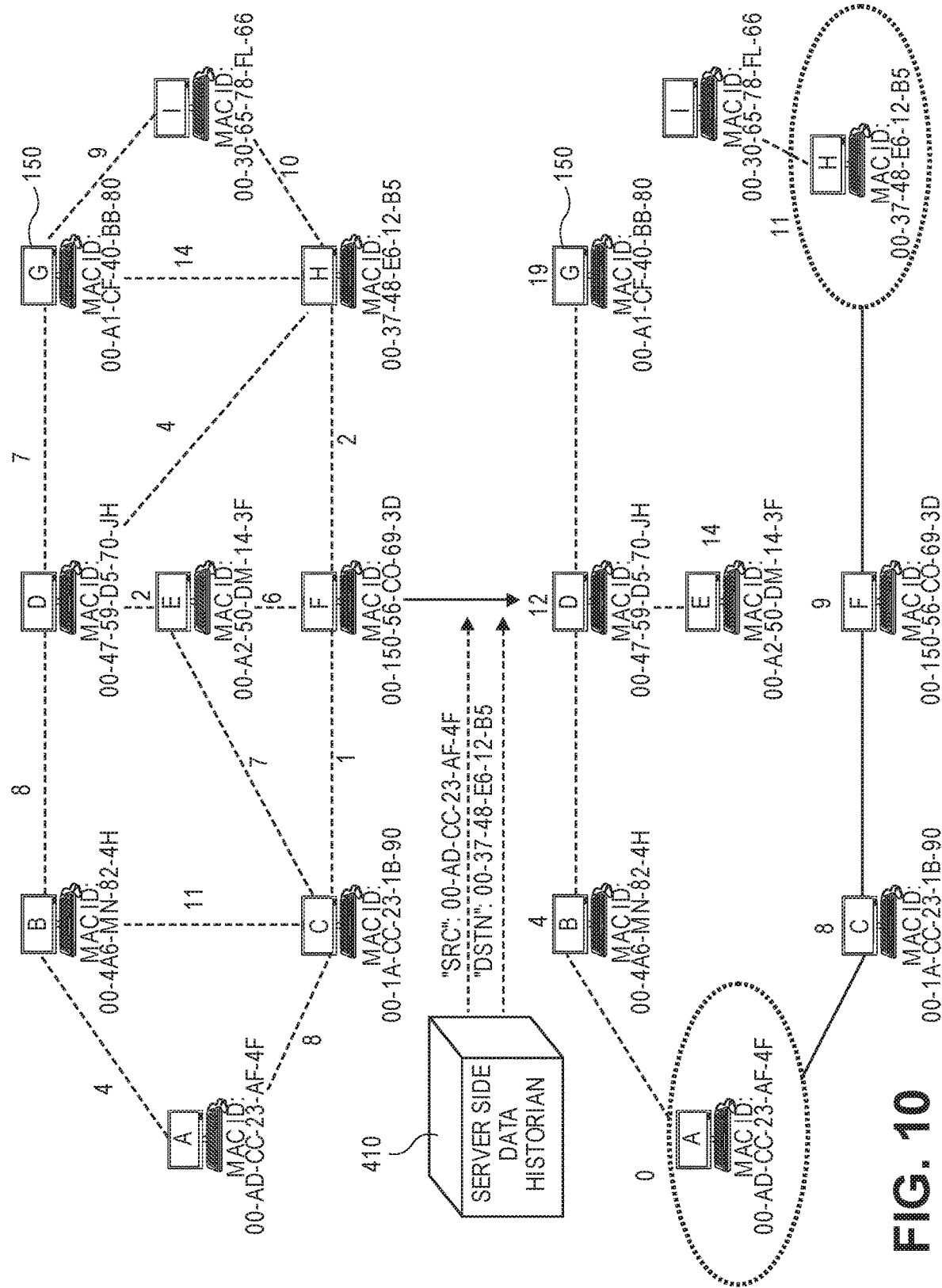
FIG. 10 illustrates the identification of the optimal path between the Source Device and the Destination Device.

FIG. 10 illustrates the identification of the optimal path between the Source Device 200 and the Destination Device 300 whose "SRC" metadata value and the "DSTN" metadata value, respectively are obtained from the first set of discrete tuples in the server side data historian 410. As per the illustration, the optimal path determination module 460, obtains the "SRC" metadata value and the "DSTN" metadata value, that is, the MAC Address/Network Address 150 of the Source Device 200 and the Destination Device 300, respectively, from the first set of discrete tuples in the server side data historian 410, which as per the illustration are 00-AD-CC-23-AF-4F and 00-37-48-E6-12-B5 respectively. The "SRC" metadata value and the "DSTN" metadata value obtained thereof are then searched in the shortest path tree set (sptset) to determine the Source Device 200 and the Destination Device 300 in the Collaborative Work Environment 100, which as per the illustration are Client Device 150 "A" and Client Device 150 "H" respectively. Once the Source Device 200, that is, Client Device 150 "A" and the Destination Device 300, that is, Client Device 150 "H" are determined, then the optimal path determination module 460 applies the Dijkstra's shortest path evaluation model and/or Prim's shortest path evaluation model and/or any other suitable path evaluation model on the shortest path tree set (sptset) to determine the optimal path between the client device 150 "A" and client device 150 "H", which has been shown in bold lines in the description and has an overall time/cost complexity of 11 units.

The optimal path identified thereof, is thereafter, either directly forwarded to the second receipt—dispatch module 490 for further processing and/or use, or stored at a second set of discrete tuples in the server side data historian 410 and then forwarded therefrom to the second receipt dispatch module 490. Person skilled in the art would appreciate that while the storing of the values of the optimal path at the second set of discrete tuples in the server side data historian 410 is not essential to the working of the embodiment, it is still preferred, because in case the optimal path is lost or altered during the course of the working of the invention, particularly while being forwarded to the second receipt— dispatch module 490, a backup copy of the optimal path may be obtained from the second set of discrete tuples in the server side data historian 410 to reinitiate from that point onwards instead of starting from scratch.

The second receipt—dispatch module 490, on receiving the optimal path forwarded to it, transmits the optimal path back to the Source Device 200 which sent the RF signal to the transfer administrator 400 in the first place. In order to transmit the optimal path back to the Source Device 200, the second receipt—dispatch module 490 uses the data communication channels 600 which implement, enroute, network peripherals such as routers, bridges, modems, hubs, switches, or a combination thereof to ensure proper and efficient transfer of the optimal path through the data communication channels 600, and network peripherals such as amplifiers, repeaters or a combination thereof, enroute, to prevent attenuation and strength loss of the optimal path and maintain it at its original state during its course of transfer.

As soon as the optimal path is transmitted to the Source Device 200 from whom the RF signal was originally received at the transfer administrator 400, the lock placed on transfer administrator 400 is lifted, thereby allowing the next RF signal to enter the transfer administrator 400 and get processed in the same manner and order as described above.

The optimal path transmitted back from the transfer administrator 400 is received at the Source Device 200 and thereafter moved to the first receipt—dispatch module 180 which in the broadest sense, forwards the data chunks to the contextual Destination Device 300 using the optimal path transmitted therein, through the data communication channels 600 which implement, enroute, network peripherals such as routers, bridges, modems, hubs, switches, or a combination thereof to ensure proper and efficient transfer of the data chunks through the data communication channels 600, and network peripherals such as amplifiers, repeaters or a combination thereof, enroute, to prevent attenuation and strength loss of the data chunks and maintain them at their original state throughout their course of transfer.

Once the data chunks pertaining to a particular electronic data file, transmitted from the Source Device 200, are received at the Destination Device 300 through their optimal path, they get subjected to reconstitution operations triggered by the client side processors 165 therein to obtain back the particular electronic data file for immediate use, or get subjected to storage operations, also triggered by the client side processors 165 therein to store the data chunks at the first set of discrete tuples in the client data historian 160 for later reference and retrieval.

Figure 11A:
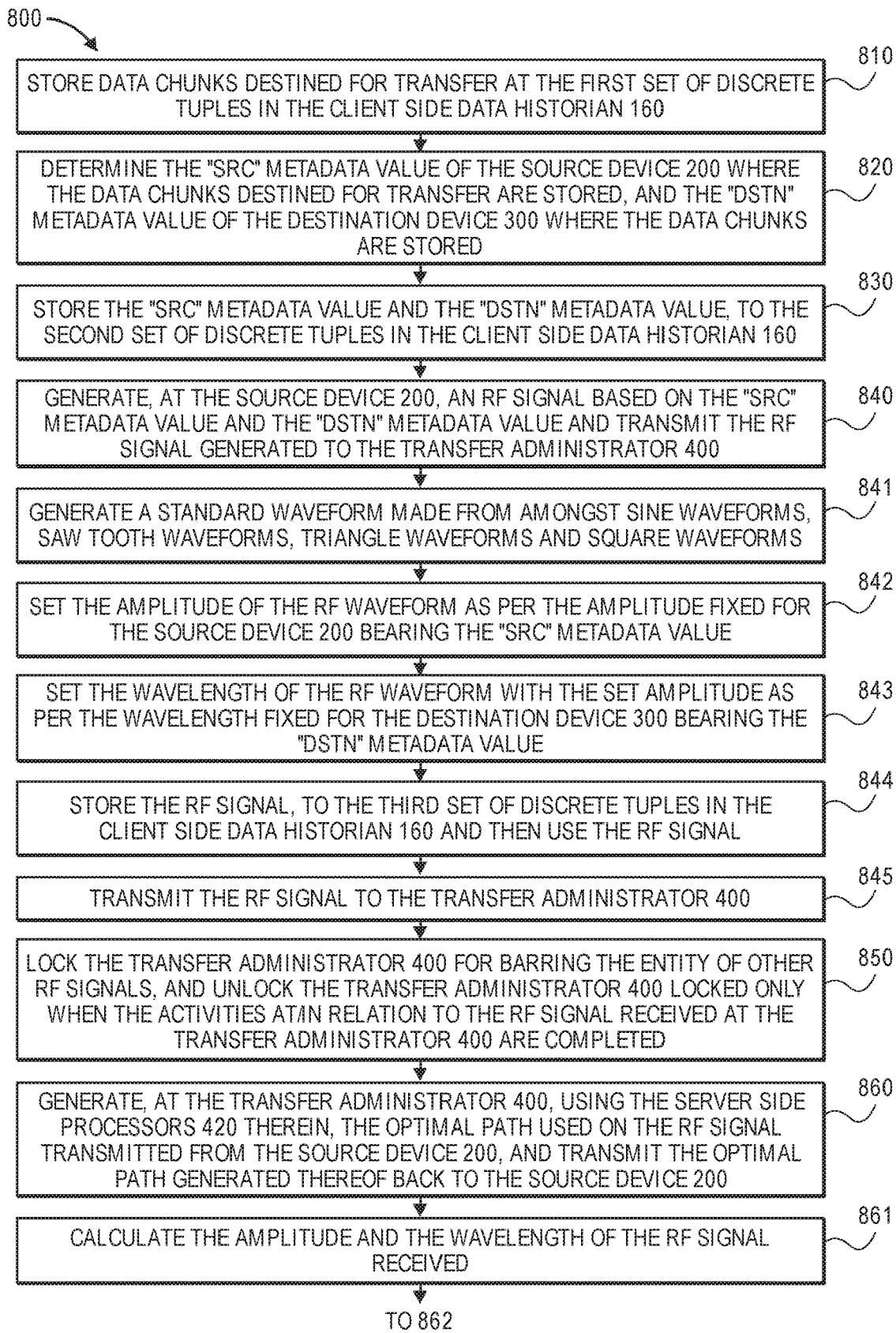
FIGS. 11A and 11B are a flowchart of a process in accordance with an embodiment.
Figure 11B:
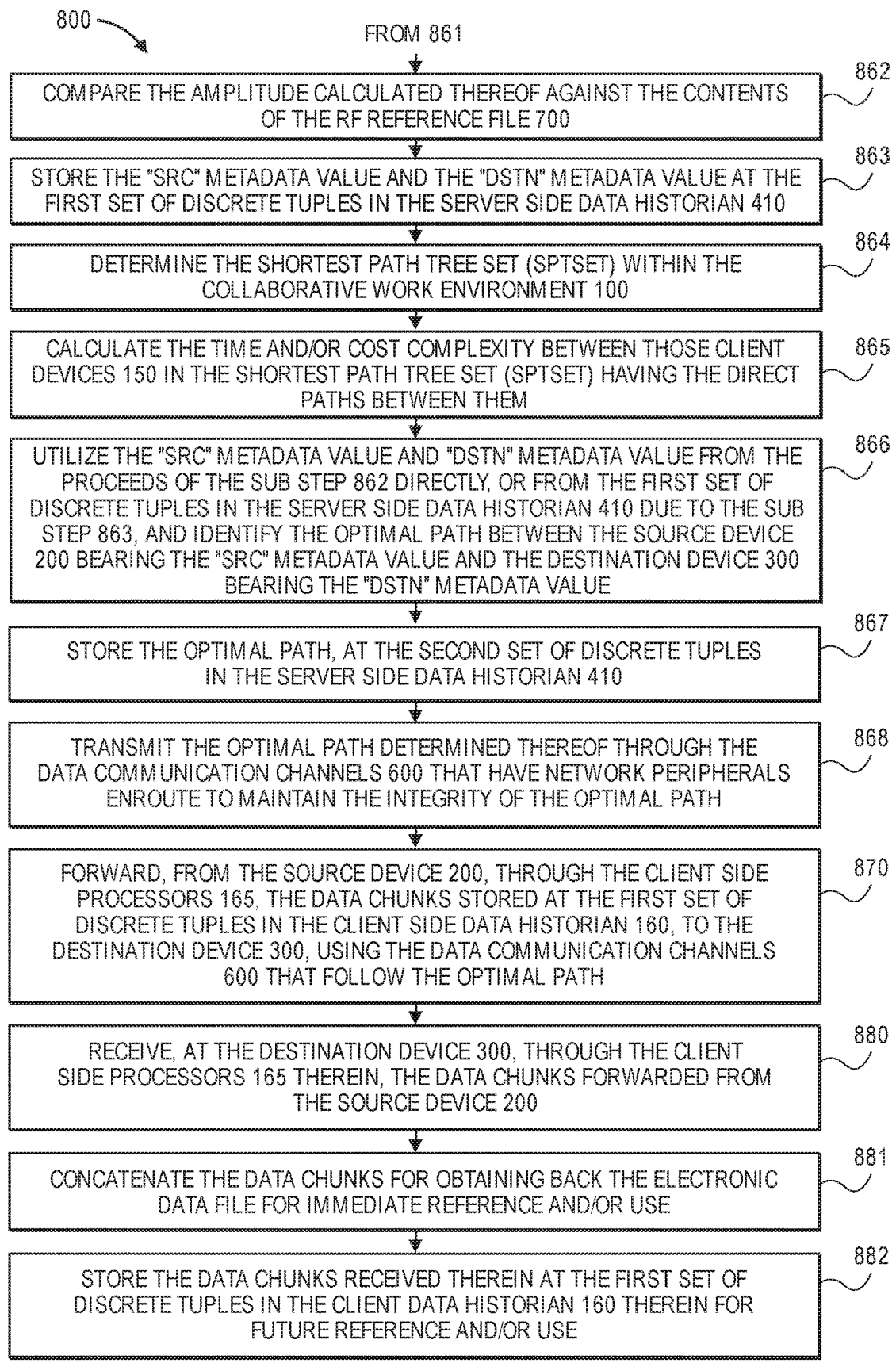

In FIGS. 11A-11B per a preferred embodiment, a method for optimizing the transferring of data chunks between the Source Device 200 and the Destination Device 300 in the Collaborative Work Environment 100 using the system described above, is referred by the numeral 800. As per the method 800, the first step is triggered at the Source Device 200 using the client side processors 165 therein, which is storing the data chunks destined for transfer at the first set of discrete tuples in the client side data historian 160, if not already stored therein 810.

After storing the data chunks 810, the method 800 triggers the next step at the Source Device 200 which is determining the "SRC" metadata value of the Source Device 200 where the data chunks destined for transfer are stored, and the "DSTN" metadata value of the Destination Device 300 where the data chunks stored at the Source Device 200 bearing the "SRC" metadata value determined thereof are destined to be received, wherein the "SRC" metadata value and the "DSTN" metadata value are the MAC address and/or the Network Address of the Source Device 200 and the Destination Device 300, respectively 820.

The "SRC" metadata value and the "DSTN" metadata value determined thereof 820, are thereafter, either directly subjected to the next step of the method 800 for further processing and/or using, or in the alternative subjected to an optional step of storing the "SRC" metadata value and the "DSTN" metadata value, to the second set of discrete tuples in the client side data historian 160 and then using the "SRC" metadata value and the "DSTN" metadata value therefrom for further processing and/or using 830. A person skilled in the art would appreciate that while the storing of the "SRC" metadata value and the "DSTN" metadata value at the second set of discrete tuples in the client side data historian 160, 830 is not essential to the working of the invention, it is still preferred, because in case the "SRC" metadata value and/or the "DSTN" metadata value are lost or altered during the working of the invention, a backup copy of the "SRC" metadata value and the "DSTN" metadata value may be obtained from the second set of discrete tuples in the client side data historian 160 for reinitiating the working of the invention from that point onwards instead of starting from scratch.

Once the step of determining the "SRC" metadata value and the "DSTN" metadata value 820, and the optional step of storing them at the second set of discrete tuples in the client side data historian 160, 830 are completed, the method 800 triggers the next step of generating, at the Source Device 200, using the client side processors 165 therein, an RF Signal based on the "SRC" metadata value and the "DSTN" metadata value obtained directly in pursuance of the step 820 explained above, or obtained from the second set of discrete tuples in the client side data historian 160, due to step 830 explained above, and transmitting the RF signal generated thereof to the transfer administrator 400, 840.

As per a preferred embodiment, the step of generating the RF signal at the Source Device 200, and transmitting it to the transfer administrator 400, 840 may involve multiple sub steps, the first sub step being generating the standard waveform of specific amplitude and specific wavelength wherein the choice of the standard waveform and the choice of its values of amplitude and wavelength may be obtained from the registered users of the Collaborative Work Environment 100, and wherein the choice of the standard waveform may be made from amongst sine waveforms, saw tooth waveforms, triangle waveforms, and square waveforms 841.

The standard waveform of the specific amplitude and the specific wavelength obtained from the sub step 841, is subjected to the next sub step which is setting the amplitude of the RF waveform as per the amplitude fixed for the Source Device 200 bearing the "SRC" metadata value determined thereof, in the RF reference file 700, 842.

The RF waveform with set amplitude obtained from the sub step 842, is subjected to the next sub step which is setting the wavelength of the RF waveform with the set amplitude as per the wavelength fixed for the Destination Device 300 bearing the "DSTN" metadata value determined thereof, in the RF reference file 700, 843, thereby obtaining the RF signal.

The RF Signal, that is, the RF waveform with set amplitude and set wavelength, obtained from the sub step 843, is thereafter either directly subjected to the next sub step within the step 840 for further processing and/or using, or in the alternative subjected to an optional sub step of storing the RF signal, to the third set of discrete tuples in the client side data historian 160 and then using the RF Signal therefrom for further processing and/or using 844. A person skilled in the art would appreciate that while the storing of the RF Signal at the third set of discrete tuples in the client side data historian 160, 844 is not essential to the working of the embodiment, it is still preferred, because in case the RF Signal is lost or altered during the working of the invention, a backup copy of the RF Signal may be obtained from the second set of discrete tuples in the client side data historian 160 for reinitiating from that point onwards instead of starting from scratch.

Once the sub steps of obtaining the RF signal from the RF waveform with set amplitude 843, and the optional sub step of storing it at the third set of discrete tuples in the client side data historian 160, 844 are completed, the step 840 of the method 800, triggers the last sub step of transmitting the RF signal to the transfer administrator 400 through the RF communication channels 500 having network peripherals enroute to maintain the integrity and strength of the RF signal, wherein the network peripherals are selected from a plurality of bridges, modems, hubs, amplifiers, switches, repeaters or a combination thereof 845.

Once the RF signal is received at the transfer administrator 400, pursuant to the step 840, more particularly, the sub step of 845, the method 800, using the server side processors 420 therein, may trigger an optional step of locking the transfer administrator 400 for barring the entry of other RF signals, and unlocking the transfer administrator 400 locked thereof only when the activities at/in relation to the RF signal received at the transfer administrator 400 are completed 850. Once the step 850 is completed, the method 800 triggers the next step which is generating, at the transfer administrator 400, using the server side processors 420 therein, the optimal path based on the RF signal transmitted from the Source Device 200, and transmitting the optimal path generated thereof back to the Source Device 200, 860.

In a preferred embodiment this step of generating the optimal path based on the RF signal transmitted from the Source Device 200, and transmitting the optimal path generated thereof to the Source Device 200, 860, comprises multiple sub steps, the first being calculating the amplitude and the wavelength of the RF signal received therein 861. Person skilled in the art would appreciate that this calculating of amplitude and wavelength of the RF signal 861 would require the application of mathematical functions and/or operations.

Once the amplitude and the wavelength of the RF signal are calculated pursuant to sub step 861, the step 860 of the method 800, triggers the next sub step of determining the "SRC" metadata value of the Source Device 200 having data chunks destined for transfer, by comparing the amplitude calculated thereof against the contents of the RF reference file 700, and the "DSTN" metadata value of the Destination Device 300 destined to receive the data chunks transferred from the Source Device 200 bearing the "SRC" metadata value determined thereof, by comparing the wavelength calculated thereof against the contents of the RF reference file 700, wherein the "SRC" metadata value and the "DSTN" metadata value are the MAC address and/or the Network address of the Source Device 200 and the Destination Device 300, respectively 862.

The "SRC" metadata value and the "DSTN" metadata value, determined from the sub step 862, are thereafter either directly subjected to the next sub step within the step 860 for further processing and/or using, or in the alternative subjected to an optional sub step of storing the "SRC" metadata value and the "DSTN" metadata value at the first set of discrete tuples in the server side data historian 410 and then using the "SRC" metadata value and the "DSTN" metadata value therefrom for further processing and/or using 863. Person skilled in the art would appreciate that while the storing of the "SRC" metadata value and the "DSTN" metadata value at the first set of discrete tuples in the server side data historian 410, 863 is not essential to the working of the embodiment, it is still preferred, because in case the "SRC" metadata value and the "DSTN" metadata value are lost or altered during the working of the invention, a backup copy of the RF Signal may be obtained from the first set of discrete tuples in the server side data historian 410 for reinitiating from that point onwards instead of starting from scratch.

Once the sub steps of determining the "SRC" metadata value and "DSTN" metadata value 862, and the optional sub step of storing them at the first set of discrete tuples in the server side data historian 410, 863 are completed, the step 860 of the method 800, triggers the sub step of determining the shortest path tree set (sptset) within the Collaborative work environment 100 wherein the shortest path tree set (sptset) comprises the client devices 150 in the Collaborative Work Environment 100 and the direct paths between them, wherever applicable 864. It is reiterated in this context that two client devices 150 would be deemed to be have direct path between them if they transfer data chunks through unimpeded one to one connection, and two client devices 150 would have indirect path between them if they transfer the data chunks between themselves using intermediary client device(s) 150.

In light of the forgoing explanation, when the step 860 of the method 800 triggers the sub step of determining the shortest path tree set (sptset) within the Collaborative Work Environment 100 then the shortest path tree set (sptset) would comprise the client devices 150 in the Collaborative Work Environment 100 and those paths between them 864 that are one to one and unimpeded, and which do not require intermediate client device(s) 150 for transferring.

After determining the shortest path tree set (sptset) 864, the step 860 of the method 800 triggers the next sub step of calculating the time and/or cost complexity between those client devices 150 in the shortest path tree set (sptset) having the direct paths between them 865. In a preferred embodiment, the calculating of the time/cost complexity between each pair of client devices 150 connected by direct path 865 may be achieved by transmitting single bit of sample data between the pair of client devices 150, and assessing the time and/or resources consumed to complete the transmitting of the single bit of sample data through the direct path between them.

After calculating the time/cost complexity between each pair of client devices 150 connected by a direct path 865, the step of 860 of the method 800 triggers the sub step of utilizing the "SRC" metadata value and "DSTN" metadata value from the proceeds of the sub step 862 directly, or from the first set of discrete tuples in the server side data historian 410 due to the sub step 863, and identifying the optimal path between the Source Device 200 bearing the "SRC" metadata value and the Destination Device 300 bearing the "DSTN" metadata value, wherein the optimal path is that direct path or the combination of direct paths between the Source Device 200 bearing the "SRC" metadata, and the Destination Device 300 bearing the "DSTN" metadata that has the lowest time/cost complexity, and has none or nominal traffic congestion, and wherein the identifying the optimal path between the Source Device 200 and the Destination Device 300, 866 may be achieved, inter alia, by applying Dijkstra's shortest path evaluation model and/or Prim's shortest path evaluation model and/or any other suitable path evaluation models.

The optimal path identified pursuant to the sub step 866, is thereafter either directly subjected to the next sub step within the step 860 for further processing and/or using, or in the alternative subjected to an optional step of storing the optimal path, at the second set of discrete tuples in the server side data historian 410 and then using the optimal path therefrom for further processing and/or using 867. A person skilled in the art would appreciate that while the storing of the optimal path at the second set of discrete tuples in the server side data historian 410, 867 is not essential to the working of the embodiment, it is still preferred, because in case the optimal path is lost or altered, a backup copy of the optimal path may be obtained from the second set of discrete tuples in the server side data historian 410 for reinitiating from that point onwards instead of starting from scratch.

Once the sub steps of utilizing the "SRC" metadata value and the "DSTN" metadata value for identifying the optimal path 866, and the optional sub step of storing it at the second set of discrete tuples in the server side data historian 410, 867 are completed, the step 860 of the method 800, triggers the sub step of transmitting the optimal path determined thereof through the data communication channels 600 that have network peripherals enroute to maintain the integrity of the optimal path, wherein the network peripherals are selected from a plurality of bridges, modems, hubs, amplifiers, switches, repeaters or a combination thereof 868.

Once the optimal path is received at the Source Device 200 from the transfer administrator 400 pursuant to the step 860, particularly the sub step 868, the method 800 triggers the next step which is forwarding, from the Source Device 200, though the client side processors 165 therein, the data chunks stored at the first set of discrete tuples in the client side data historian 160 therein, to the Destination Device 300, using the data communication channels 600 that follow the optimal path received therein, wherein the data communication channels 600 have network peripherals enroute to maintain the integrity and the strength of the data chunks, and wherein the network peripherals are selected from a plurality of bridges, modems, hubs, amplifiers, switches, repeaters or a combination thereof 870.

Thereafter, the method 800 triggers the last step of receiving, at the Destination Device 300, through the client side processors 165 therein, the data chunks forwarded from the Source Device 200, 880. In a preferred characterization, the receiving of the data chunks at the Destination Device 300, may further trigger concatenating the data chunks for obtaining back the electronic data file for immediate reference and/or use 881, or trigger storing of the data chunks received therein at the first set of discrete tuples in the client data historian 160 therein for future reference and/or use 882.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A system to optimize the transfer of data chunks between a source device (200) and destination device (300) in a collaborative work environment (100) using a transfer administrator (400) wherein the system is characterized to— store, at the source device (200), more particularly at a first set of discrete tuples in a Client Side Data Historian (160), the data chunks destined for transfer;

determine, at the source device (200), through client side processors (165) therein, an (SRC) metadata value of the source device (200) where the data chunks destined for transfer are stored, and a (DSTN) metadata value of the destination device (300) where the data chunks at the source device (200) bearing the (SRC) metadata value determined thereof, are destined to be received;

generate, at the source device (200), through client side processors (165) therein, a radio frequency (RF) signal based on the (SRC) metadata value and the (DSTN) metadata value determined thereof, and transmit the RF signal generated thereof to the transfer administrator (400);

generate, at the transfer administrator (400), through server side processors (420) therein, an optimal path based on the RF signal transmitted therein, and transmit back the optimal path generated thereof to the source device (200);

forward, from the source device (200), through the client side processors (165) therein, the data chunks stored in the first set of discrete tuples in the client side data historian (160) to the destination device (300), pursuant to the optimal path transmitted therein, through data communication channels (600) that have network peripherals enroute to maintain the integrity and strength of the data chunks, wherein the network peripherals are selected from a plurality of bridges, modems, hubs, amplifiers, switches, repeaters or a combination thereof; and receive, at the destination device (300), through the client side processors (165) therein, the data chunks forwarded from the source device (200).

2. The system as claimed in claim 1 wherein the system determines, at the source device (200), through the client side processors (165) therein, the (SRC) metadata value of the source device (200) and the (DSTN) metadata value of the destination device (300), by invoking a metadata resolution module (170).

3. The system as claimed in claim 1 wherein the system determines, at the source device (200), through the client side processors (165) therein, the (SRC) metadata value of the Source Device 200 and the (DSTN) metadata value of the destination device (300), and thereafter stores the (SRC) metadata value and the (DSTN) metadata value determined thereof at a second set of discrete tuples in the client side data historian (160), for backup and/or other exigencies.

4. The system as claimed in claim 1 wherein the system generates, at the source device (200), through the client side processors (165) therein, the RF signal based on the (SRC) metadata value and the (DSTN) metadata value determined thereof, and transmits the RF signal generated thereof to the transfer administrator 400, by— an RF signal generation module (175), comprising— an RF waveform generator (176) that generates a standard waveform of a specific amplitude and a specific wavelength wherein a choice of the standard waveform and a choice of the specific values of amplitude and wavelength of the standard waveform chosen thereof, may be obtained from registered users of the collaborative work environment (100), further wherein the choice of the standard waveform may be made from amongst sine waveforms, saw tooth waveforms, triangle waveforms, and square waveforms, an amplitude tuner (177) comprising amplitude conditioning units that set the amplitude of the RF waveform obtained from the RF waveform generator (176), as per the amplitude fixed for the source device (200) bearing the (SRC) metadata value determined thereof, in the RF reference file (700), and a wavelength tuner (178) comprising wavelength conditioning units configured to set a wavelength of the RF waveform with a set amplitude, obtained from the amplitude tuner (177), as per the wavelength fixed for the destination device (300) bearing the (DSTN) metadata value determined thereof, in the RF reference file (700); and a first receipt—dispatch module (180) that transfers the RF signal generated thereof to the transfer administrator (400) through the RF communication channels (500) that have network peripherals enroute to maintain the integrity and strength of the RF signal, wherein the network peripherals are selected from a plurality of bridges, modems, hubs, amplifiers, switches, repeaters or a combination thereof.

5. The system as claimed in claim 1 wherein the system generates, at the source device (200), through the client side processors (165) therein, the RF signal based on the (SRC) metadata value and the (DSTN) metadata value determined thereof, and thereafter stores the RF signal generated thereof at a third set of discrete tuples in the client side data historian (160), for backup and/or other exigencies, before transmitting the RF signal generated thereof to the transfer administrator (400).

6. The system as claimed in claim 1, wherein before the system generates, at the transfer administrator (400), through server side processors (420) therein, the optimal path based on the RF signal transmitted therein, the system locks the transfer administrator (400) to bar entry of other RF signals and unlocks the transfer administrator (400) locked thereof only when the activities at/in relation to the RF signal transmitted at the transfer administrator (400) are completed.

7. The system as claimed in claim 1 wherein the system generates, at the transfer administrator (400), through server side processors (420) therein, an optimal path based on the RF signal transmitted therein, and transmits back the optimal path generated thereof to the source device (200), by— a radio frequency (RF) signal interpretation module (430) that— calculates the amplitude and the wavelength of the RF signal transmitted therein, determines the (SRC) metadata value of the source device (200) having data chunks destined for transfer, by comparing the amplitude calculated thereof against the contents of the RF reference file (700), and determines the (DSTN) metadata value of the destination device (300) destined to receive the data chunks transferred from the source device (200) bearing the (SRC) metadata value determined thereof, by comparing the wavelength calculated thereof against the contents of the RF reference file (700);

an optimal path determination module (460), communicatively connectible with the RF signal interpretation module (430) that— determines a shortest path tree set (sptset) within the collaborative work environment (100) wherein the shortest path tree set (sptset) comprises the client devices (150) in the collaborative work environment (100) and direct paths between them, further wherein the direct path refers to that path between two client devices (150) which is one to one and unimpeded, and does not require intermediary client devices (150) between them to transfer data chunks, calculates time and/or cost complexity between the client devices (150) in the shortest path tree set (sptset) having direct paths between them, obtains the (SRC) metadata value and the (DSTN) metadata value determined thereof, and identifies an optimal path between the source device (200) bearing the (SRC) metadata value obtained thereof, and the destination device (300) bearing the (DSTN) metadata value obtained thereof; and a second receipt—dispatch module (490), communicatively connectible with the optimal path determination module (460) that transmits the optimal path determined thereof back to the source device (200) which sent the RF signal to the transfer administrator (400) originally, wherein the second receipt—dispatch module (490) transmits the optimal path through the data communication channels (600) that have network peripherals enroute to maintain an integrity and strength of the optimal path, further wherein the network peripherals are selected from a plurality of bridges, modems, hubs, amplifiers, switches, repeaters or a combination thereof.

8. The system as claimed in claim 7 wherein the system generates, at the transfer administrator (400), the optimal path by invoking the RF signal interpretation module (430) which after determining the (SRC) metadata value of the source device (200) having data chunks destined for transfer, and after determining the (DSTN) metadata value of the destination device (300) destined to receive the data chunks transferred from the source device (200) bearing the (SRC) metadata value determined thereof, stores the (SRC) metadata value and the (DSTN) metadata value determined thereof at a first set of discrete tuples in the server side data historian (410), for backup and/or other exigencies.

9. The system as claimed in claim 7 wherein the system generates, at the transfer administrator (400), an optimal path by invoking the optimal path determination module (460) which after identifying the optimal path between the source device (200) and the destination device (300), stores the optimal path identified thereof at a second set of discrete tuples in the server side data historian (410), for backup and/or other exigencies.

10. The system as claimed at claim 1 wherein the system receives, at the destination device (300), through the client side processors (165) therein, the data chunks forwarded from the source device (200) and thereafter either concatenates the data chunks received therein to obtain the electronic data file for immediate reference and/or use, or stores the data chunks received therein at the first set of discrete tuples in the client data historian (160) for future reference and/or use.

11. A method for optimizing the transferring of data chunks between source device (200) and destination device (300) in collaborative work environment (100), in conjunction with the system claimed in claim 1, wherein the method is characterized by— storing, at the source device (200), more particularly at the first set of discrete tuples in the Client Side Data Historian (160), the data chunks destined for transfer;

determining, at the source device (200), through client side processors (165) therein, the (SRC) metadata value of the source device (200) where the data chunks destined for transfer are stored, and the (DSTN) metadata value of the destination device (300) where the data chunks at the source device (200) bearing the (SRC) metadata value determined thereof are destined to be received;

generating, at the source device (200), through the client side processors (165) therein, a radio frequency (RF) signal based on the (SRC) metadata value and the (DSTN) metadata value determined thereof, and transmitting the RF signal generated thereof to the transfer administrator (400);

generating, at the transfer administrator (400), through server side processors (420) therein, the optimal path based on the RF signal transmitted from the source device (200), and transmitting the optimal path generated thereof to the source device (200); and forwarding, from the source device (200), though the client side processors (165) therein, the data chunks stored in the first set of discrete tuples in the client side data historian (160) to the destination device (300), pursuant to the optimal path transmitted therein, through the data communication channels (600) that have network peripherals enroute to maintain the integrity and strength of the data chunks, wherein the network peripherals are selected from a plurality of bridges, modems, hubs, amplifiers, switches, repeaters or a combination thereof (870); and receiving, at the destination device (300), through the client side processors (165) therein, the data chunks forwarded from the source device (200).

12. The method as claimed in claim 11 wherein the system after determining, at the source device (200), the (SRC) metadata value and the (DSTN) metadata value (820), may trigger the step of storing, at the source device (200), the (SRC) metadata value and the (DSTN) metadata value determined thereof at the second set of discrete tuples in the client side data historian (160), for backup and/or other exigencies.

13. The method as claimed in claim 11 wherein the generating, at the source device (200), through the client side processors (165) therein, the RF signal based on the (SRC) metadata value and the (DSTN) metadata value determined thereof, and the transmitting of the RF signal generated thereof to the transfer administrator (400) comprises the sub steps of— generating the standard waveform of specific amplitude and specific wavelength wherein the choice of the standard waveform and the choice of its values of amplitude and wavelength may be obtained from the registered users of the collaborative work environment (100), further wherein the choice of the standard waveform may be made from amongst sine waveforms, saw tooth waveforms, triangle waveforms, and square waveforms;

setting the amplitude of the RF waveform as per the amplitude fixed for the source device (200) bearing the (SRC) metadata value determined thereof, in the RF reference file (700);

setting the wavelength of the RF waveform with set amplitude, as per the wavelength fixed for the destination device (300) bearing the (DSTN) metadata value determined thereof, in the RF reference file (700) to obtain the RF signal;

storing the RF signal generated thereof at the third set of discrete tuples in the client side data historian (160) for backup and/or other exigencies; and transmitting the RF signal generated thereof to the transfer administrator (400) through the RF communication channels (500) having network peripherals enroute to maintain an integrity and strength of the RF signal, wherein the network peripherals are selected from a plurality of bridges, modems, hubs, amplifiers, switches, repeaters or a combination thereof.

14. The method as claimed in claim 11 wherein the generating of the optimal path and the transmitting of the optimal path generated thereof to the source device (200), is initiated by receiving the RF signal transmitted from the source device (200), at the transfer administrator (400), through the server side processors (420) therein, and followed by locking the transfer administrator (400) for barring the entry of other RF signals and unlocking the transfer administrator (400) locked thereof only when the activities at/in relation to the RF signal received therein are completed at the transfer administrator (400).

15. The method as claimed in claim 11 wherein the generating, at the transfer administrator (400), through server side processors (420) therein, the optimal path based on the RF signal transmitted from the source device (200), and transmitting of the optimal path generated thereof to the source device (200) comprises the sub steps of—

- calculating the amplitude and the wavelength of the RF signal received therein;
- determining the (SRC) metadata value of the source device (200) having data chunks destined for transfer, by comparing the amplitude calculated thereof against the contents of the RF reference file (700), and determining the (DSTN) metadata value of the destination device (300) destined to receive the data chunks transferred from the source device (200) bearing the (SRC) metadata value determined thereof, by comparing the wavelength calculated thereof against the contents of the RF reference file (700);
- storing the (SRC) metadata value and the (DSTN) metadata value determined thereof at the first set of discrete tuples at the server side data historian (410), for backup and/or other exigencies;
- determining the shortest path tree set (sptset) within the collaborative work environment (100) wherein the shortest path tree set (sptset) comprises the client devices (150) in the collaborative work environment (100) and the direct paths between them, further wherein the direct path refers to that path between two client devices (150) which is one to one and unimpeded, and does not require intermediary client devices (150) between them to transfer data chunks;
- calculating the time and/or cost complexity between the client devices (150) in the shortest path tree set (sptset) having the direct paths between them;
- utilizing the (SRC) metadata value and the (DSTN) metadata value determined thereof for identifying the optimal path between the source device (200) bearing the (SRC) metadata value determined thereof and the destination device (300) bearing (DSTN) metadata value determined thereof; and
- storing the optimal path identified thereof at the second set of discrete tuples at the server side data historian (410), for backup and/or other exigencies;
- transmitting the optimal path determined thereof through the data communication channels (600) that have network peripherals enroute to maintain the integrity and strength of the optimal path, wherein the network peripherals are selected from a plurality of bridges, modems, hubs, amplifiers, switches, repeaters or a combination thereof.

16. The method as claimed in claim 11 wherein the receiving, at the destination device (300), through the client side processors (165) therein, the data chunks forwarded from the source device (200), is either followed by concatenating the data chunks received therein for obtaining back the electronic data file for immediate reference and/or use, or followed by storing the data chunks received therein at the first set of discrete tuples in the client data historian therein for future reference and/or use.

* * * * *